United States Patent [19]
Hayek et al.

[11] Patent Number: 5,958,898
[45] Date of Patent: Sep. 28, 1999

[54] PROCESS FOR ALTERING THE FUNCTION AND COMPOSITION OF GUT ASSOCIATED LYMPHOID TISSUE IN AN ANIMAL

[75] Inventors: Michael G. Hayek, Dayton; Gregory D. Sunvold, Eaton, both of Ohio

[73] Assignee: The Iams Company, Dayton, Ohio

[*] Notice: This patent is subject to a terminal disclaimer.

[21] Appl. No.: 09/050,567

[22] Filed: Mar. 30, 1998

Related U.S. Application Data

[60] Provisional application No. 60/041,915, Apr. 7, 1997.

[51] Int. Cl.$^6$ ............................ A61K 31/715; A23K 1/18
[52] U.S. Cl. ............................ 514/54; 514/867; 426/630; 426/635; 426/658; 426/805
[58] Field of Search ................................... 514/53, 54, 61, 514/867; 536/123, 123.1, 123.12, 123.13; 426/630, 635, 658, 805

[56] References Cited

U.S. PATENT DOCUMENTS

| | | | |
|---|---|---|---|
| 5,085,883 | 2/1992 | Garleb et al. | 426/590 |
| 5,260,279 | 11/1993 | Greenberg | 514/21 |
| 5,531,989 | 7/1996 | Paul | 424/93.4 |
| 5,607,975 | 3/1997 | Smith et al. | 514/563 |
| 5,616,569 | 4/1997 | Reinhart | 514/54 |
| 5,744,134 | 4/1998 | Paul | 424/93.4 |
| 5,763,485 | 6/1998 | Smith et al. | 514/563 |

FOREIGN PATENT DOCUMENTS

WO 87/02679   5/1987   WIPO.

OTHER PUBLICATIONS

Serizawa et al., *Journal of Gastroenterology and Hepatology*, vol. 11: 811–818, 1996.

Kishino, Yasuo., *Shokumotsu Arerugi* (Ed. Sugano & Kishino), pp. 105–128, 1995.

C.J. Field et al., "Feeding fermentable fiber alters the function and composition of gut associated Lymphoid tissue (GALT)" FASEB Journal for Experimental Biology, vol. 11, 1997, Bethesda, MD., p. A650.

Database WPI, Section CH, Week 8633, Derwent Publications Ltd., London, GB; Class B04, AN 86–215130 XP002072378.

M. Dietz et al., "Influence of a blend of fructo–oligosaccharides and sugar beet fiber on nutrient digestibility and plasma metabolite concentrations in healthy Beagles" American Journal of Veterinary Research, vol. 58, No. 11, 1997, pp. 1238–1242, XP–002072352.

Willard M D et al., Effects of Dietary Supplementation of Fructo–Olgosaccharides On Small Intestinal Bacterial Overgrowth in Dogs:, Amer. Journ. of Veter. Research, vol. 55, May 1994,pp. 654–659.

M.D. Howard et al., "Effect of Fermantable Fiber Consumption by the Dog on Nitrogen Balance and Fecal Microbial Nitrogen Excretion", FASEB J. (1996) 10:A257.

G.D. Sunvold et al., "Dietary Fiber for Dogs: IV. In Vitro Fermentation of Selected Fiber Sources by Dog Fecal Inoculum and In Vivo Digestion and Metabolism of Fiber–Supplemented Diets", *J. Animal Sci.* (1995) 73:1099–1109.

*Primary Examiner*—Howard C. Lee
*Attorney, Agent, or Firm*—Killworth, Gottman, Hagan & Schaeff, L.L.P.

[57] ABSTRACT

A process for feeding an animal a diet which alters the function and composition of gut associated lymphoid tissue (GALT) by increasing the proportion of T cells in the GALT is provided. The diet includes fermentable fibers which have an organic matter disappearance of 15 to 60 percent when fermented by fecal bacteria for a 24 hour period, the fibers being present in amounts from about 1 to 11 weight percent of supplemental total dietary fiber. The animal is maintained on the diet for a sufficient period of time to allow the fermentable fibers to ferment in the colon of the animal to increase the proportion of T cells in the GALT of the animal.

16 Claims, No Drawings

PROCESS FOR ALTERING THE FUNCTION AND COMPOSITION OF GUT ASSOCIATED LYMPHOID TISSUE IN AN ANIMAL

CROSS REFERENCE TO RELATED APPLICATIONS

This patent application claims the benefit of U.S. Provisional Application Ser. No. 60/041,915, filed Apr. 7, 1997.

BACKGROUND OF THE INVENTION

This invention relates to a process involving the use of a pet food composition containing fermentable fibers to alter the function and composition of lymphoid tissue in an animal.

Recent research has suggested that dietary fiber is important for its fermentation properties in the large intestine of dogs and cats. For example, Reinhart, U.S. Pat. No. 5,616,569, describes the addition of fermentable dietary fiber to a pet food composition for the purpose of maintaining normal gastrointestinal function and ameliorating chronic diarrhea in animals. Howard et al, FASEB J. (1996) 10:A257, teach that fermentable fiber consumption by dogs can result in the partition of waste nitrogen from the urine to the feces, increasing nitrogen excretion through the feces of the animal. Sunvold et al, J. Anim. Sci. (1995) 73:1099–1109, found that feeding moderately fermentable fibers to dogs could promote gastrointestinal tract health by optimizing short chain fatty acid (SCFA) production in the intestines of the animals.

Disease prevention is important both in humans as well as animals. A healthy immune system plays an important role both in preventing and fighting diseases. The effects of certain dietary additives such as anti-oxidants and vitamins on the immune systems of animals has also been reported. However, there remains a need in the art for promoting a healthy immune system in animals such as dogs.

SUMMARY OF THE INVENTION

The present invention meets that need by providing a process for feeding an animal a diet which alters the function and composition of gut associated lymphoid tissue (GALT) by increasing the proportion of T cells in the GALT. It is believed that the gut associated lymphoid tissue (GALT) represents approximately 40% of the body's immune effector cells, 80% of the body's immunological secreting cells, and accounts for as much as 25% of mucosal mass. GALT is composed of the cells residing in the lamina propria regions of the gut, those interspaced between epithelial cells (intraepithelial lymphocytes; EL) and cells residing in organized lymphatic tissue such as Peyer's Patches and mesenteric lymph nodes.

The process of the present invention also results in an increase in T cell mitogen responses in those tissues containing a high proportion of T cells. By feeding the animal a diet which contains fermentable fibers, the cell-mediated immune function in cells from mesenteric lymph nodes, representing the interface between the gut and the peripheral immune system, was measurably improved.

The process involves feeding a dog a diet of a pet food composition containing fermentable fibers which have an organic matter disappearance (OMD) of 15 to 60 percent when fermented by fecal bacteria for a 24 hour period, the fibers being present in amounts from about 1 to 11 weight percent of supplemental total dietary fiber. The dog is maintained on the diet for a sufficient period of time to allow the fermentable fibers to ferment in the colon of the dog. The fermentation results in an increased proportion of T cells in the GALT as well as resulting in increased T cell mitogen responses in those tissues containing a high proportion of T cells.

Preferably, the pet food composition contains from 2 to 9 weight percent of supplemental total dietary fiber of fermentable fibers. More preferably, the pet food composition contains from 3 to 7 weight percent of supplemental total dietary fiber of fermentable fibers. Most preferably, the pet food composition contains from 4 to 7 weight percent of supplemental total dietary fiber of fermentable fibers.

Preferably, the fermentable fibers have an organic matter disappearance of 20 to 50 percent. More preferably, the fermentable fibers have an organic matter disappearance of 30 to 40 percent.

In addition, the fermentable fibers are preferably selected from the group consisting of beet pulp, gum arabic, gum talha (a form of gum arabic), psyllium, rice bran, carob bean gum, citrus pulp, pectin, fructooligosaccharides or inulin, mannanoligosaccharides and mixtures thereof. More preferably, the fermentable fibers are selected from the group consisting of beet pulp, gum arabic and fructooligosaccharides. Most preferably, the fermentable fibers are a blend of beet pulp, gum talha, and fructooligosaccharides. A preferred weight ratio of beet pulp to fructooligosaccharides in the fermentable fiber blend is from about 3:1 to 6:1, and most preferably 4:1. A preferred weight ratio of beet pulp to gum talha to fructooligosaccharides is 6:2:1.5.

Accordingly, it is a feature of the present invention to provide a pet food composition and process for altering the function and composition of GALT by increasing the proportion of T cells in the GALT. It is a further feature of the present invention to provide a pet food composition and process which causes an increase in T cell mitogen responses in those tissues containing a high proportion of T cells. These, and other features and advantages of the present invention, will become apparent from the following detailed description.

DETAILED DESCRIPTION OF THE PREFERRED EMBODIMENTS

The present invention uses a pet food composition containing fermentable fibers to alter the function and composition of gut associated lymphoid tissue (GALT) by increasing the proportion of T cells in the GALT. The process also causes an increase in T cell mitogen responses in those tissues containing a high proportion of T cells.

The present invention uses a pet food composition containing fermentable fibers which display certain organic matter disappearance percentages. The fermentable fibers used in the present invention have an organic matter disappearance (OMD) of from about 15 to 60 percent when fermented by fecal bacteria in vitro for a 24 hour period. That is, from about 15 to 60 percent of the total organic matter originally present is fermented and converted by the fecal bacteria. The organic matter disappearance of the fibers is preferably 20 to 50 percent, and most preferably is 30 to 40 percent.

Thus, in vitro OMD percentage may be calculated as follows:

$$\{1-[(OM\ residue - OM\ blank)/OM\ initial]\} \times 100,$$

where OM residue is the organic matter recovered after 24 hours of fermentation, OM blank is the organic matter recovered in corresponding blank tubes (i.e., tubes containing medium and diluted feces, but no substrate), and OM initial is that organic matter placed into the tube prior to fermentation. Additional details of the procedure are found in Sunvold et al, J. Anim. Sci. 1995, vol.73:1099–1109.

The pet food composition can be any suitable pet food formula which also provides adequate nutrition for the animal. For example, a typical canine diet for use in the present invention may contain about 30% crude protein, about 20% fat, and about 10% total dietary fiber. However, no specific ratios or percentages of these or other nutrients are required.

Fermentable fibers which are useful in the present invention produce short chain fatty acids (SCFAs) within a range of from about 28 to about 85 mmol SCFA per 1000 Calories (kcals) of metabolizable energy (ME), and more preferably within a range of from about 42 to about 71 mmol SCFA per 1000 ME kcals. This equates to a composition which has a total fermentable fiber content which yields from about 100 to about 350 mmol SCFA/kg of diet.

Millimoles of SCFAs per 1000 metabolizable energy kilocalories are calculated by first calculating the total Calories of metabolizable energy (ME) in a given diet composition per kilogram of the composition. The number of grams per 1000 kcal ME may be derived from the first calculation. Then the grams, and thus millimoles, of the fermentable fiber components of the composition may be calculated.

The fermentable fiber of the present invention may be any fiber source which intestinal bacteria present in the animal can ferment to produce significant quantities of SCFAs. "Significant quantities" of SCFAs, for purposes of this invention, are amounts over 0.5 mmol of total SCFAs/gram of substrate in a 24 hour period. Preferred fibers include beet pulp, gum arabic (including gum talha), psyllium, rice bran, carob bean gum, citrus pulp, pectin, fructooligosaccharides, mannanoligosaccharides and mixtures of these fibers.

The fermentable fibers are used in the pet food composition in amounts from 1 to 11 weight percent of supplemental total dietary fiber, preferably from 2 to 9 weight percent, more preferably from 3 to 7 weight percent, and most preferably from 4 to 7 weight percent.

A definition of "supplemental total dietary fiber" first requires an explanation of "total dietary fiber". "Total dietary fiber" is defined as the residue of plant food which is resistant to hydrolysis by animal digestive enzymes. The main components of total dietary fiber are cellulose, hemicellulose, pectin, lignin and gums (as opposed to "crude fiber", which only contains some forms of cellulose and lignin). "Supplemental total dietary fiber" is that dietary fiber which is added to a food product above and beyond any dietary fiber naturally present in other components of the food product. Also, a "fiber source" is considered such when it consists predominantly of fiber.

In order that the invention may be more readily understood, reference is made to the following example which is intended to illustrate the invention, but not limit the scope thereof.

EXAMPLE 1

To determine the effect of fermentable fibers on GALT, 16 adult dogs (each weighing 23.2±0.5 kg) were fed for 14 days one of two isoenergetic and isonitrogenous diets (eight dogs on each diet) which utilized poultry and fish as protein sources and poultry as a fat source. The diets provided about 4,650 kcal/kg and also contained smaller amounts of vitamins and minerals. The starch concentration of the diets was allowed to vary so that the diets could be formulated to contain equivalent amounts of total dietary fiber (6.6% by weight). The composition of the diets was identical except for the following: Diet #1 included 10.52% by weight of pregelatinized cornstarch and 7.00% by weight cellulose fiber (non-fermentable); Diet #2 included 7.99% by weight of pregelatinized cornstarch, and, as fermentable fiber, a blend of 6.01% beet pulp, 1.5% fructooligosaccharides, and 2.00% by weight gum arabic.

After 14 days, immune cells were isolated from mesenteric lymph nodes, Peyer's patches, and intraepithelial (IEL) and lamina propria regions of the intestine in the dogs. The in vitro response to mitogens (estimated by $^3$H-thymidine incorporation at 62 h) and immune phenotypes (by flow cytometry) were determined. The dogs which were fed Diet #2, the diet containing the fermentable fiber, had higher (P<0.03) responses of mesenteric cells to Concavalin A (Con A, 2-fold), Phytohemagglutinin (PHA, 1.9-fold) and Phorbol Myristate Acetate plus Ionomycin (1.3-fold) and of IEL to PHA (1.7-fold) as compared to dogs fed Diet #1.

As shown in Table 1, compared to dogs fed Diet #1, dogs which were fed Diet #2 also exhibited lower (P<0.03) mitogen responses to Con A by lamina propria cells and to Con A, PHA, and Pokeweed by cells from Peyer's patches. A higher (P<0.04) proportion of CD4$^+$ (25 vs. 18%) T cells in mesenteric lymph nodes and CD8$^+$ (30 vs. 21%) T cells in IEL and CD8$^+$ (8 vs. 5%) in Peyer's patches were also found in dogs fed Diet #2 versus those dogs which were fed Diet #1.

TABLE 1

Mitogen Response by immune cells isolated from lymphoid organs

| Diet | Peripheral Blood Lymphocytes Fermentable Fiber Content | | Mesenteric Lymph Node Lymphocytes Fermentable Fiber Content | | Peyer's Patches Lymphocytes Fermentable Fiber Content | | Intraepithelial Lymphocytes Fermentable Fiber Content | | Lamina Propria Lymphocytes Fermentable Fiber Content | |
|---|---|---|---|---|---|---|---|---|---|---|
| Mitogen[1] | Low (n = 12) | High (n = 12) | Low (n = 8) | High (n = 7) | Low (n = 7) (Stimulation Index) | High (n = 6) | Low (n = 7) | High (n = 6) | Low (n = 7) | High (n = 6) |
| Con A-40 h | 117 ± 11[2] | 113 ± 12 | 47 ± 9 | 74 ± 4*[3] | 16 ± 3 | 18 ± 5 | 26 ± 6* | 26 ± 7 | 31 ± 3 | 20 ± 3* |
| Con A-62 h | 81 ± 14 | 86 ± 14 | 106 ± 12 | 206 ± 37* | 371 ± 93 | 148 ± 38* | 139 ± 35 | 144 ± 19 | 52 ± 10 | 27 ± 3* |
| PHA-40 h | 99 ± 8 | 88 ± 9 | 90 ± 23 | 69 ± 6 | 14 ± 4 | 13 ± 4 | 28 ± 4 | 26 ± 8 | 11 ± 2 | 13 ± 2 |
| PHA-62 h | 53 ± 8 | 61 ± 8 | 80 ± 9 | 160 ± 33* | 145 ± 40 | 50 ± 10* | 95 ± 12 | 164 ± 26* | 22 ± 4 | 20 ± 2 |
| Pokeweed-40 h | 23 ± 9 | 28 ± 9 | 45 ± 7 | 40 ± 5 | 15 ± 5 | 17 ± 6 | 22 ± 5 | 19 ± 5 | 15 ± 2 | 11 ± 2 |
| Pokeweed-62 h | 19 ± 6 | 20 ± 6 | 47 ± 4 | 72 ± 5** | 90 ± 17 | 56 ± 6 | 232 ± 40 | 182 ± 35 | 19 ± 2 | 20 ± 1 |

TABLE 1-continued

Mitogen Response by immune cells isolated from lymphoid organs

| Diet | Peripheral Blood Lymphocytes Fermentable Fiber Content | | Mesenteric Lymph Node Lymphocytes Fermentable Fiber Content | | Peyer's Patches Lymphocytes Fermentable Fiber Content | | Intraepithelial Lymphocytes Fermentable Fiber Content | | Lamina Propria Lymphocytes Fermentable Fiber Content | |
|---|---|---|---|---|---|---|---|---|---|---|
| | Low (n = 12) | High (n = 12) | Low (n = 8) | High (n = 7) | Low (n = 7) | High (n = 6) | Low (n = 7) | High (n = 6) | Low (n = 7) | High (n = 6) |
| Mitogen[1] | | | | | (Stimulation Index) | | | | | |
| PMA + Iono-40 h | 167 ± 22 | 152 ± 20 | 78 ± 11 | 84 ± 10 | 34 ± 5 | 15 ± 2** | 63 ± 11 | 99 ± 37 | 34 ± 5 | 32 ± 8 |
| PMA + Iono-62 h | 155 ± 21 | 133 ± 18 | 191 ± 12 | 264 ± 14* | 264 ± 36 | 211 ± 20 | 587 ± 77 | 642 ± 85 | 78 ± 12 | 79 ± 9 |

[1]Mitogen abbreviations used: Con A, Concanavalin A; PHA, Phytohemagglutinin; PMA + Iono, Phorbol Myristate Acetate + Ionomycin
[2]Values are mean ± SEM (number of animals indicated in parenthesis at the top of each column)
[3]Significantly different from the low fermentable fiber group as identified by a t-test, *($P < 0.05$), **($P < 0.01$)

The results of this experiment demonstrate that the incorporation of fermentable fibers into the diet for 14 days altered the proportion of T cells in GALT and increased T cell mitogen responses in tissues containing a high proportion of T cells. Such results indicate an improvement in cell-mediated immune function in the tissues which were studied.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A process for altering the function and composition of gut-associated lymphoid tissue in an animal by increasing the proportion of T cells in such tissue comprising the steps of:

feeding an animal a diet consisting essentially of a composition containing fermentable fibers comprising a blend of beet pulp, gum arabic, and fructooligosaccharides, which fermentable fibers have an organic matter disappearance of 15 to 60 percent when fermented by fecal bacteria for a 24 hour period, said fibers being present in amounts from about 1 to 11 weight percent of supplemental total dietary fiber, and maintaining said animal on said diet for a sufficient period of time to allow said fermentable fibers to ferment in the colon of said animal, to increase the proportion of T cells in said gut associated lymphoid tissue of said animal.

2. The process of claim 1 wherein said composition contains from 2 to 9 weight percent of supplemental total dietary fiber of said fermentable fibers.

3. The process of claim 1 wherein said composition contains from 3 to 7 weight percent of supplemental total dietary fiber of said fermentable fibers.

4. The process of claim 1 wherein said composition contains from 4 to 7 weight percent of supplemental total dietary fiber of said fermentable fibers.

5. The process of claim 1 wherein said fermentable fibers have an organic matter disappearance of 20 to 50 percent.

6. The process of claim 5 wherein said fermentable fibers have an organic matter disappearance of 30 to 40 percent.

7. The process of claim 1 wherein said animal is a dog.

8. The process of claim 1 in which the weight ratio of beet pulp to fructooligosaccharides is from about 3:1 to about 6:1.

9. The process of claim 1 in which the weight ratio of beet pulp to gum arabic to fructooligosaccharides is 6:2:1.5.

10. A process for altering the function and composition of gut-associated lymphoid tissue in an animal by increasing the proportion of T cells in such tissue comprising the steps of:

feeding an animal a diet consisting essentially of a composition containing a blend of at least two fermentable fibers, at least one of said fibers selected from the group consisting of psyllium, fructooligosaccharides, mannanooligosaccharides, and inulin, which fermentable fibers have an organic matter disappearance of 15 to 60 percent when fermented by fecal bacteria for a 24 hour period, said fibers being present in amounts from about 1 to 11 weight percent of supplemental total dietary fiber, and maintaining said animal on said diet for a sufficient period of time to allow said fermentable fibers to ferment in the colon of said animal, to increase the proportion of T cells in said gut associated lymphoid tissue of said animal.

11. A pet food product comprising a composition containing a blend of at least two fermentable fibers, at least one of said fibers selected from the group consisting of psyllium, fructooligosaccharides, mannanooligosaccharides, and inulin, which fermentable fibers have an organic matter disappearance of 15 to 60 percent when fermented by fecal bacteria for a 24 hour period, said fibers being present in amounts from about 1 to 11 weight percent of supplemental total dietary fiber.

12. The pet food product of claim 11 wherein said pet food composition contains from 2 to 9 weight percent of supplemental total dietary fiber of said fermentable fibers.

13. The pet food product of claim 12 wherein said pet food composition contains from 3 to 7 weight percent of supplemental total dietary fiber of said fermentable fibers.

14. The pet food product of claim 11 wherein said pet food composition contains from 4 to 7 weight percent of supplemental total dietary fiber of said fermentable fibers.

15. The pet food product of claim 11 wherein said fermentable fibers have an organic matter disappearance of 20 to 50 percent.

16. The pet food product of claim 11 wherein said fermentable fibers have an organic matter disappearance of 30 to 40 percent.

* * * * *